(12) United States Patent
Merker et al.

(10) Patent No.: US 8,456,803 B2
(45) Date of Patent: Jun. 4, 2013

(54) METHOD FOR PRODUCTION OF ELECTROLYTE CAPACITORS

(75) Inventors: Udo Merker, Cologne (DE); Klaus Wussow, Netphen (DE)

(73) Assignee: Heraeus Precious Metals GmbH & Co. KG, Hanau (DE)

( * ) Notice: Subject to any disclaimer, the term of this patent is extended or adjusted under 35 U.S.C. 154(b) by 258 days.

(21) Appl. No.: 13/003,043

(22) PCT Filed: Jul. 2, 2009

(86) PCT No.: PCT/EP2009/058308
§ 371 (c)(1),
(2), (4) Date: Feb. 7, 2011

(87) PCT Pub. No.: WO2010/003874
PCT Pub. Date: Jan. 14, 2010

(65) Prior Publication Data
US 2011/0164348 A1    Jul. 7, 2011

(30) Foreign Application Priority Data
Jul. 11, 2008   (DE) .................. 10 2008 032 578

(51) Int. Cl.
*H01G 9/00* (2006.01)
(52) U.S. Cl.
USPC ........... 361/523; 361/516; 361/519; 361/525; 361/528; 361/529

(58) Field of Classification Search
USPC ............ 361/523, 525, 528–529, 516–517, 361/509, 512, 530; 29/25.01, 25.03
See application file for complete search history.

(56) References Cited

U.S. PATENT DOCUMENTS

| 6,361,572 | B1 * | 3/2002 | Igaki et al. | 29/25.03 |
|---|---|---|---|---|
| 6,409,777 | B2 * | 6/2002 | Kobatake et al. | 29/25.03 |
| 6,671,167 | B2 * | 12/2003 | Araki et al. | 361/523 |
| 7,341,801 | B2 * | 3/2008 | Reuter et al. | 429/128 |
| 7,377,947 | B2 * | 5/2008 | Merker et al. | 29/25.03 |
| 7,563,290 | B2 | 7/2009 | Qiu et al. | |
| 2005/0124784 | A1 | 6/2005 | Sotzing | |
| 2007/0064376 | A1 | 3/2007 | Merker et al. | |
| 2008/0010797 | A1 | 1/2008 | Qiu et al. | |
| 2008/0247121 | A1 | 10/2008 | Qiu et al. | |

FOREIGN PATENT DOCUMENTS

| EP | 1713103 A1 | 10/2006 |
|---|---|---|
| EP | 1746613 A1 | 1/2007 |
| EP | 1988128 A1 | 11/2008 |
| JP | 2003-229330 | 8/2003 |
| WO | WO-2005/034261 A1 | 4/2005 |
| WO | WO-2005/090434 A1 | 9/2005 |
| WO | WO-2007/031207 A1 | 3/2007 |

* cited by examiner

Primary Examiner — Nguyen T Ha
(74) Attorney, Agent, or Firm — Servilla Whitney LLC (57) ABSTRACT

The invention relates to a process for producing electrolytic capacitors with low equivalent series resistance, to electrolytic capacitors produced by this process and to the use of such electrolytic capacitors.

15 Claims, 2 Drawing Sheets

METHOD FOR PRODUCTION OF ELECTROLYTE CAPACITORS

CROSS-REFERENCE TO RELATED APPLICATIONS

This application is the national stage entry of PCT/EP09/58308, filed on Jul. 2, 2009, which claims priority to German Application No. 102008032578.3, filed on Jul. 11, 2008, the disclosures of which are incorporated herein by reference in their entireties.

FIELD

The invention relates to a process for producing electrolytic capacitors with low equivalent series resistance, to electrolytic capacitors produced by this process and to the use of such electrolytic capacitors.

BACKGROUND

A conventional solid electrolytic capacitor consists generally of a porous metal electrode, of an oxide layer disposed on the metal surface, an electrically conductive solid introduced into the porous structure, an outer electrode (contact connection), for example a silver layer or a metal foil with a separator, and also further electrical contacts and an encapsulation.

Examples of solid electrolytic capacitors are tantalum, aluminium, niobium and niobium oxide capacitors comprising charge transfer complexes or manganese dioxide or polymer solid electrolytes. The use of porous bodies has the advantage that, owing to the large surface area, a very high capacitance density, i.e. a high electrical capacitance in a small space, can be achieved.

Particularly suitable solid electrolytes are, owing to their high electrical conductivity, π-conjugated polymers. π-conjugated polymers are also referred to as conductive polymers or as synthetic metals. They are gaining increasing economic significance, since polymers have advantages over metals with regard to processibility, to weight and to the controlled adjustment of properties by chemical modification. Examples of known π-conjugated polymers are polypyrroles, polythiophenes, polyanilines, polyacetylenes, polyphenylenes and poly(p-phenylene-vinylenes), a particularly important and industrially utilized polythiophene being poly-3,4-(ethylene-1,2-dioxy)thiophene, often also referred to as poly(3,4-ethylenedioxythiophene), since it, in its oxidized form, has a very high conductivity.

Practical development in electronics is increasingly requiring solid electrolytic capacitors with very low equivalent series resistances (ESR). The reasons for this are, for example, falling logic voltages, a higher integration density and rising clock frequencies in integrated circuits. Moreover, a low ESR also lowers the power consumption, which is advantageous particularly for mobile, battery-operated applications. There is therefore the desire to reduce the ESR of solid electrolytic capacitors as far as possible.

European Patent EP-B 340 512 describes the production of a solid electrolyte from 3,4-ethylene-1,2-dioxythiophene and the use of the cationic polymers thereof, prepared by oxidative polymerization, as a solid electrolyte in electrolytic capacitors. Poly(3,4-ethylenedioxythiophene), as a replacement for manganese dioxide or for charge transfer complexes in solid electrolytic capacitors, lowers the equivalent series resistance of the capacitor and improves the frequency behaviour owing to the higher electrical conductivity.

A disadvantage of this and similar processes is that the conductive polymer is obtained by polymerization in situ in the electrolytic capacitor. To this end, the monomer, for example 3,4-ethylene-1,2-dioxythiophene, and oxidizing agent have to be introduced into the porous metal body together or successively in the presence of solvents, and then polymerized. Such a chemical reaction is, however, undesired in the course of production of electronic components, since it is very difficult always to allow the chemical reaction to proceed identically in millions of small porous components, in order to produce capacitors of identical specification.

Another disadvantage of in situ polymerizations in the production of solid electrolytes for capacitors is that the oxidizing agents can damage the dielectric (oxide layer) on the metal electrode. The oxidizing agents used are generally transition metal salts, for example Fe(III) salts. The reaction products of the polymerization which remain in the electrode body after the polymerization are then not just the electrically conductive polymer but also the reduced metal salts, for example Fe(II) salts. It is possible to attempt to remove these salts by subsequent washing steps. However, this is complex and does not succeed completely, i.e. residues of the metal salts always remain in the electrode body. As is well known, transition metals in particular can damage the dielectric, such that the elevated leakage currents resulting therefrom significantly reduce the lifetime of the capacitors or even make it impossible to use the capacitors under harsh conditions, such as high temperatures and/or high air humidity.

Furthermore, the production process of solid electrolytic capacitors when an in situ polymerization is employed is very complex: a polymerization process (impregnation, polymerization, washing) generally last several hours, it is necessary under some circumstances to use potentially explosive or toxic solvents here, and very many polymerization processes are required in order to produce a solid electrolyte.

Monomers can also be polymerized electrochemically in the absence of oxidizing agents. However, the electrochemical polymerization requires that a conductive film is first deposited on the insulating oxide layer of the metal electrode. This then again requires an in situ polymerization with all the disadvantages detailed above. Finally, this layer then has to be provided with electrical contacts for each individual metal electrode. This contact connection is very costly and inconvenient in mass production and can damage the oxide layer. Furthermore, electrochemical deposition in the pores of the porous metal electrode is very difficult, since the deposition takes place primarily on the outside of the electrode body owing to the electrical potential profile.

In Japanese patent application JP2006287182, polymer solutions are adjusted to a pH of 5.4 to 8.1 in order not to corrode the dielectric of the electrolytic capacitor and thus to lower the ESR. The use of polymer solutions having a pH of 1.2 to 1.6 for producing solid electrolytic capacitors leads to very high ESR values.

In PCT application WO-A1-2007/031206, the solid electrolyte of an electrolytic capacitor is produced by means of a dispersion comprising particles of poly(3,4-ethylenedioxythiophene)/polystyrenesulfonate with a mean diameter of 1-100 nm. For corrosion-sensitive dielectrics, such as aluminium oxide, dispersions having a pH of 6 are used in order not to damage the dielectric. Even though this process overcomes the above-described disadvantages of the in situ polymerization, there is a need to further reduce the ESR.

There was thus a need to provide a process with which the ESR of solid electrolytic capacitors can be lowered further without in situ polymerization.

SUMMARY

It was therefore an object of the invention to provide such a process and the capacitors improved thereby.

It has now been found that, surprisingly, by means of dispersions which comprise electrically conductive polymers and whose pH is greater than or equal to 1.8 and less than or equal to 3.9, it is possible to produce solid electrolytes for capacitors, which possess a significantly lower ESR.

A pH greater than or equal to 1.8 and less than or equal to 3.9 surprisingly has a very positive influence on the ESR of the solid electrolyte. This is especially surprising since, according to existing knowledge, especially in the case of corrosion-sensitive dielectrics such as aluminium oxide, the dielectric is attacked at such pH values and the ESR is increased.

DETAILED DESCRIPTION

The present invention therefore provides a process for producing an electrolytic capacitor, at least comprising, that a) onto a porous body, at least comprising
  a porous electrode body (2) of an electrode material and a dielectric (3)
  which covers the surface of this electrode material,
  is applied a dispersion A)
  which comprises at least particles B) of an electrically conductive polymer and a dispersant D),
b) and a solid electrolyte (4) which partly or fully covers the dielectric surface is formed by at least partly removing the dispersant D), characterized in that the pH of the dispersion A) measured at 25° C. is greater than or equal to 1.8 and less than or equal to 3.9.

The pH of dispersion A) is preferably greater than or equal to 2 and less than or equal to 3.5, more preferably greater than or equal to 2 and less than or equal to 3, even more preferably greater than or equal to 2 and less than or equal to 2.8, the pH being measured at 25° C.

To establish the pH, for example, bases or acids can be added to the dispersions. The bases used may be inorganic bases, for example sodium hydroxide, potassium hydroxide, calcium hydroxide or ammonia, or organic bases, for example ethylamine, diethylamine, triethylamine, propylamine, dipropylamine, tripropylamine, isopropylamine, diisopropylamine, butylamine, dibutylamine, tributylamine, isobutylamine, diisobutylamine, triisobutylamine, 1-methylpropylamine, methylethylamine, bis(1-methyl)propylamine, 1,1-dimethylethylamine, pentylamine, dipentylamine, tripentylamine, 2-pentylamine, 3-pentylamine, 2-methylbutylamine, 3-methylbutylamine, bis(3-methylbutylamine), tris(3-methylbutylamine), hexylamine, octylamine, 2-ethylhexylamine, decylamine, N-methylbutylamine, N-ethylbutylamine, N,N-dimethylethylamine, N,N-dimethylpropylamine, N-ethyldiisopropylamine, allylamine, diallylamine, ethanolamine, diethanolamine, triethanolamine, methylethanolamine, methyldiethanolamine, dimethylethanolamine, diethylethanolamine, N-butylethanolamine, N-butyldiethanolamine, dibutylethanolamine, cyclohexyl-ethanolamine, cyclohexyldiethanolamine, N-ethylethanolamine, N-propylethanolamine, tert-butyl-ethanolamine tert-butyldiethanolamine, propanolamine, dipropanolamine, tripropanolamine or benzylamine. The acids used may be inorganic acids, for example sulphuric acid, phosphoric acid or nitric acid, or organic acids, for example carboxylic or sulphonic acids. Preference is given to those additions which do not impair the film formation of the dispersions and remain in the solid electrolyte at elevated temperatures, for example soldering temperatures, for example the bases dimethylethanolamine, diethanolamine, ammonia or triethanolamine, and the acid polystyrene-sulphonic acid.

The particles B) of the dispersion A) have a specific electrical conductivity of greater than 100 S/cm in the dry state.

The specific electrical conductivity of the particles B) in the dry state is the specific electrical conductivity of the film in the dry state which forms from the particles B) as the dispersion A) dries.

Preference is given to using dispersions A) whose particles B) in the dried state have a specified electrical conductivity of greater than 150 S/cm, more preferably greater than 200 S/cm, even more preferably greater than 250 S/cm, exceptionally preferably greater than 300 S/cm and in a particularly preferred embodiment greater than 400 S/cm.

The viscosity of dispersion A) may, according to the method of application, be between 0.1 and 1000 mPas (measured with a rheometer at 20° C. and a shear rate of $100 \text{ s}^{-1}$). The viscosity is preferably 0.1 to 500 mPas, more preferably between 1 and 200 mPas, most preferably 1 to 100 mPas and exceptionally preferably 1 to 50 mPas.

The solids content of dispersion A) is 0.1-90 percent by weight (% by wt.), preferably 0.1-30% by wt., most preferably 0.3-10% by wt. and exceptionally preferably 0.5-5% by wt.

The solids content is determined by drying dispersion A) at a temperature which is high enough to remove the dispersant but does not decompose the solid in doing so.

In the process, particles B) of the conductive polymer in dispersion A) have a mean diameter of 1 to 100 nm, preferably a mean diameter of 1 to 80 nm, more preferably of 1 to 50 nm and most preferably of 5 to 40 nm.

The diameter of particles B) is determined by means of ultracentrifuge analysis. The general method is described in Colloid Polym. Sci. 267, 1113-1116 (1989). In the case of particles B) which swell in the dispersion, the particle size in the swollen state is determined. A diameter distribution of particles B) refers to a mass distribution of the particles in the dispersion as a function of the particle diameter.

In the process, particles B) of the conductive polymer in dispersion A) preferably have a $d_{90}$ of the diameter distribution of less than 150 nm, more preferably less than 100 nm, most preferably less than 80 nm and exceptionally preferably less than 50 nm.

In the process, particles B) of the conductive polymer in dispersion A) preferably have a $d_{10}$ of the diameter distribution greater than 1 nm, more preferably greater than 3 nm, most preferably greater than 5 nm.

The $d_{10}$ of the diameter distribution means that 10% of the total mass of all particles B) of the conductive polymer in dispersion A) can be attributed to those particles B) which possess a diameter less than or equal to the $d_{10}$. The $d_{90}$ of the diameter distribution means that 90% of the total mass of all particles B) of the conductive polymer in dispersion A) can be attributed to those particles B) which possess a diameter less than or equal to the $d_{90}$.

Dispersion A) preferably contains only small amounts, if any, of metals and transition metals. Metals are understood here to mean metals or metal ions of main group or transition group metals, the latter also being referred to hereinafter as transition metals, of the Periodic Table of the elements. As is well known, transition metals in particular can damage the dielectric, and so the resulting increased leakage currents can significantly reduce the lifetime of the capacitors or even make use of the capacitors under harsh conditions, such as high temperatures and/or high atmospheric humidity, impossible.

Dispersion A) in the process preferably has a content of metals less than 5000 mg/kg, more preferably less than 1000 mg/kg, most preferably less than 200 mg/kg. Metals here include, for example, Na, K, Mg, Al, Ca, Fe, Cr, Mn, Co, Ni, Cu, Ru, Ce or Zn.

Dispersion A) in the process preferably has a content of transition metals less than 1000 mg/kg, more preferably less than 100 mg/kg, most preferably less than 20 mg/kg. Transition metals here include, for example, Fe, Cu, Cr, Mn, Ni, Ru, Ce, Zn or Co.

Dispersion A) in the process preferably has an iron content less than 1000 mg/kg, more preferably less than 100 mg/kg, most preferably less than 20 mg/kg.

The low concentrations of metals in the dispersions have the great advantage that the dielectric is not damaged in the course of formation of the solid electrolyte and in the later operation of the capacitor.

In the electrolytic capacitor produced by the process according to the invention, the electrode material forms a porous body of high surface area, and is present, for example, in the form of a porous sintered body or of a roughened film. This porous body is also referred to hereinafter as an electrode body for short.

The electrode body covered with a dielectric is also referred to hereinafter as an oxidized electrode body. The term "oxidized electrode body" also encompasses those electrode bodies which are covered with a dielectric which has not been produced by oxidizing the electrode body.

The electrode body covered with a dielectric and completely or partly with a solid electrolyte is also referred to hereinafter as capacitor body for short.

"Outer surface of the capacitor body" is understood to mean the outer faces of the capacitor body.

In the context of the invention, the term "polymers" includes all compounds with more than one identical or different repeat unit.

Conductive polymers are understood here to mean, in particular, the compound class of the π-conjugated polymers which, after oxidation or reduction, possess electrical conductivity. Conductive polymers are preferably understood to mean those π-conjugated polymers which, after oxidation, possess an electrical conductivity in the order of magnitude of at least 1 µS cm$^{-1}$.

The particles B) of the electrically conductive polymer in dispersion A) preferably comprise at least one polythiophene, polypyrrole or polyaniline, which are optionally substituted.

The particles B) of the electrically conductive polymer in dispersion A) preferably comprise at least one polythiophene with repeat units of the general formula (I) or of the general formula (II) or of the general formula (X) or repeat units of the formulae (I) and (II) or repeat units of the formulae (I) and (X) or repeat units of the formulae (II) and (X) or repeat units of the formulae (I), (II) and (X)

(I)

(II)

(X)

in which
A is an optionally substituted $C_1$-$C_5$-alkylene radical,
R is independently H, a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical,
x is an integer of 0 to 8 and, in the case that a plurality of R radicals is bonded to A, they may be the same or be different.

The general formulae (I) and (II) should be understood such that x substituents R may be bonded to the alkylene radical A.

Particular preference is given to polythiophenes with repeat units of the general formula (I) or (II) or repeat units of the general formula (I) and (II), in which A is an optionally substituted $C_2$-$C_3$-alkylene radical and x is 0 or 1.

Very particular preference is given, as the conductive polythiophene of the particles B), to poly(3,4-ethylenedioxythiophene), which is optionally substituted.

In the context of the invention, the prefix "poly-" should be understood to mean that more than one identical or different repeat unit is present in the polymer or polythiophene. The polythiophenes contain a total of n repeat units of the general formula (I) or of the general formula (II) or of the general formula (X) or of the general formulae (I) and (II) or of the general formulae (I) and (X) or of the general formulae (II) and (X) or of the general formulae (I), (II) and (X), where n is an integer of 2 to 2000, preferably 2 to 100. The repeat units of the general formula (I) or of the general formula (II) or of the general formula (X) or the repeat units of the general formulae (I) and (II) or the repeat units of the general formulae (I) and (X) or the repeat units of the general formulae (II) and (X) or the repeat units of the general formulae (I), (II) and (X) may each be the same or different within a polythiophene. Preference is given to polythiophenes having in each case identical repeat units of the general formula (I) or of the general formula (II) or of the general formula (X) or having in each case identical repeat units of the general formulae (I) and (II), or of the general formulae (I) and (X), or of the general formulae (II) and (X), or having in each case identical repeat units of the general formulae (I), (II) and (X). Particular preference is given to polythiophenes having in each case identical repeat units of the general formula (I) or of the general formula (II) or having in each case identical repeat units of the general formulae (I) and (II).

On the end groups, the polythiophenes preferably each bear H.

In the context of the invention, $C_1$-$C_5$-alkylene radicals A are preferably methylene, ethylene, n-propylene, n-butylene or n-pentylene. $C_1$-$C_{18}$-Alkyl R is preferably linear or branched $C_1$-$C_{18}$-alkyl radicals such as methyl, ethyl, n- or isopropyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$-$C_{12}$-cycloalkyl radicals R are, for example, cyclopentyl, cyclohexyl, cycloheptyl, cyclooctyl, cyclononyl or cyclodecyl, $C_6$-$C_{14}$-aryl radicals R are, for example, phenyl or naphthyl, and $C_7$-$C_{18}$-aralkyl radicals R are, for example, benzyl, o-, m-, p-tolyl, 2,3-, 2,4-, 2,5-, 2,6-, 3,4-, 3,5-xylyl or mesityl. The above list serves to illustrate the invention by way of example and should not be considered to be exclusive.

In the context of the invention, any further substituents of the A radicals and/or of the R radicals include numerous organic groups, for example alkyl, cycloalkyl, aryl, aralkyl, alkoxy, halogen, ether, thioether, disulphide, sulphoxide, sulphone, sulphonate, amino, aldehyde, keto, carboxylic ester, carboxylic acid, carbonate, carboxylate, cyano, alkylsilane and alkoxysilane groups, and also carboxamide groups.

The scope of the invention encompasses all radical definitions, parameters and elucidations above and specified below, in general or within preferred ranges, with one another, i.e. including any combinations between the particular ranges and preferred ranges.

The polythiophenes used as the solid electrolyte in the preferred process may be uncharged or cationic. In preferred embodiments, they are cationic, "cationic" relating only to the charges which reside on the main polythiophene chain. According to the substituent on the R radicals, the polythiophenes may bear positive and negative charges in the structural unit, in which case the positive charges are on the main polythiophene chain and the negative charges are, if present, on the R radicals substituted by sulphonate or carboxylate groups. The positive charges of the main polythiophene chain may be partly or fully saturated by the anionic groups which may be present on the R radicals. Viewed overall, the polythiophenes in these cases may be cationic, uncharged or even anionic. Nevertheless, in the context of the invention, all are considered to be cationic polythiophenes, since the positive charges on the main polythiophene chain are crucial. The positive charges are not shown in the formulae, since their exact number and position cannot be stated unambiguously. The number of positive charges is, however, at least 1 and at most n, where n is the total number of all repeat units (identical or different) within the polythiophene.

To balance the positive charge, if this has not already been done by the optionally sulphonate- or carboxylate-substituted and thus negatively charged R radicals, the cationic polythiophenes require anions as counterions.

Counterions may be monomeric or polymeric anions, the latter also being referred to hereinafter as polyanions.

Polymeric anions are preferred over monomeric anions, since they contribute to film formation and, owing to their size, lead to thermally more stable, electrically conductive films.

Polymeric anions here may, for example, be anions of polymeric carboxylic acids, such as polyacrylic acids, polymethacrylic acid or polymaleic acids, or polymeric sulphonic acids, such as polystyrenesulphonic acids and polyvinylsulphonic acids. These polycarboxylic and -sulphonic acids may also be copolymers of vinylcarboxylic and vinylsulphonic acids with other polymerizable monomers, such as acrylic esters and styrene.

A preferred polymeric anion in the particles B) mentioned is an anion of a polymeric carboxylic or sulphonic acid.

A particularly preferred polymeric anion is the anion of polystyrenesulphonic acid (PSS).

The molecular weight of the polyacids which afford the polyanions is preferably 1000 to 2 000 000, more preferably 2000 to 500 000. The polyacids or alkali metal salts thereof are commercially available, for example polystyrenesulphonic acids and polyacrylic acids, or else are preparable by known processes (see, for example, Houben Weyl, Methoden der organic Chemie [Methods of Organic Chemistry], vol. E 20 Makromolekulare Stoffe [Macromolecular Substances], part 2, (1987), p. 1141 ff.).

Polymeric anion(s) and electrically conductive polymers may be present in dispersion A) especially in a weight ratio of 0.5:1 to 50:1, preferably of 1:1 to 30:1, more preferably 2:1 to 20:1. The weight of the electrically conductive polymers corresponds here to the initial weight of the monomers used, assuming that there is full conversion in the polymerization.

The monomeric anions used are, for example, those of $C_1$-$C_{20}$-alkanesulphonic acids, such as those of methanesulphonic acid, ethanesulphonic acid, propanesulphonic acid, butanesulphonic acid or higher sulphonic acids such as dodecanesulphonic acid, of aliphatic perfluorosulphonic acids, such as trifluoromethanesulphonic acid, perfluorobutanesulphonic acid or perfluorooctanesulphonic acid, of aliphatic $C_1$-$C_{20}$-carboxylic acids such as 2-ethylhexylcarboxylic acid, of aliphatic perfluorocarboxylic acids, such as trifluoroacetic acid or perfluorooctanoic acid, and aromatic sulphonic acids optionally substituted by $C_1$-$C_{20}$-alkyl groups, such as benzenesulphonic acid, o-toluenesulphonic acid, p-toluenesulphonic acid or dodecylbenzenesulphonic acid, and of cycloalkanesulphonic acids such as camphorsulphonic acid, or tetrafluoroborates, hexafluorophosphates, perchlorates, hexafluoroantimonates, hexafluoroarsenates or hexachloroantimonates.

Preferred monomeric anions are the anions of p-toluenesulphonic acid, methanesulphonic acid or camphorsulphonic acid.

Cationic polythiophenes which contain anions as counterions to balance the charge are often also referred to in the technical field as polythiophene/(poly)anion complexes.

Dispersion A) may comprise one or more dispersants D). Examples of dispersants D) include the following solvents: aliphatic alcohols such as methanol, ethanol, i-propanol and butanol; aliphatic ketones such as acetone and methyl ethyl ketone; aliphatic carboxylic esters such as ethyl acetate and butyl acetate; aromatic hydrocarbons such as toluene and xylene; aliphatic hydrocarbons such as hexane, heptane and cyclohexane; chlorohydrocarbons such as dichloromethane and dichloroethane; aliphatic nitriles such as acetonitrile, aliphatic sulphoxides and sulphones such as dimethyl sulphoxide and sulpholane; aliphatic carboxamides such as methylacetamide, dimethylacetamide and dimethylformamide; aliphatic and araliphatic ethers such as diethyl ether and anisole. In addition, it is also possible to use water or a mixture of water with the aforementioned organic solvents as dispersant D).

Preferred dispersants D) are water or other protic solvents such as alcohols, for example methanol, ethanol, i-propanol and butanol, and also mixtures of water with these alcohols, the particularly preferred solvent being water.

Dispersion A) may also comprise further substances such as surface-active substances, for example ionic and/or nonionic surfactants; adhesion promoters, for example organofunctional silanes or hydrolysates thereof, e.g. 3-glycidoxypropyltrialkoxysilane, 3-aminopropyltriethoxysilane, 3-mercaptopropyltrimethoxysilane, 3-methacryloyloxypropyltrimethoxysilane, vinyltrimethoxysilane or octyltriethoxysilane; crosslinkers such as melamine compounds, capped isocyanates, functional silanes—e.g. tetraethoxysilane, alkoxysilane hydrolysates, for example based on tetraethoxysilane, epoxysilanes such as 3-glycidoxypropyltrialkoxysilane-polyurethanes, polyacrylates or polyolefin dispersions, or further additives.

Dispersions A) preferably comprise further additives which enhance the conductivity, for example compounds containing ether groups, for example tetrahydrofuran; compounds containing lactone groups, such as γ-butyrolactone, γ-valerolactone; compounds containing amide or lactam groups, such as caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, pyrrolidone; sulphones and sulphoxides, for example sulpholane (tetramethylenesulphone), dimethyl sulphoxide (DMSO); sugars or sugar derivatives, for example sucrose, glucose, fructose, lactose, sugar alcohols, for example sorbitol, mannitol; imides, for example succinimide or maleimide; furan derivatives, for example 2-furancarboxylic acid, 3-furancarboxylic acid, and/or di- or polyalcohols, for example ethylene glycol, glycerol or di- or triethylene glycol. Particular preference is given to using, as conductivity-enhancing additives, tetrahydrofuran, N-methylformamide, N-methylpyrrolidone, ethylene glycol, dimethyl sulphoxide or sorbitol. The further additives may be present either in each case alone or in any desired combination thereof in dispersion A).

Dispersions A) may additionally comprise one or more binders. Preference is given to polymeric, organic binders such as, for example, polyvinyl alcohols, polyvinylpyrrolidones, polyvinyl chlorides, polyvinyl acetates, polyvinyl butyrates, polyacrylic esters, polyacrylamides, polymethacrylic esters, polymethacrylamides, polyacrylonitriles, styrene/acrylic ester, vinyl acetate/acrylic ester and ethylene/vinyl acetate copolymers, polybutadienes, polyisoprenes, polystyrenes, polyethers, polyesters, polycarbonates, polyurethanes; polyamides, polyimides, polysulphones, melamine-formaldehyde resins, epoxy resins, silicone resins or celluloses. In addition, preferred polymeric organic binders also include those which are obtained by adding crosslinkers, for example melamine compounds, capped isocyanates or functional silanes, for example 3-glycidoxypropyltrialkoxysilane, tetraethoxysilane and tetraethoxysilane hydrolysate, or crosslinkable polymers, for example polyurethanes, polyacrylates or polyolefins, and subsequent crosslinking. Such crosslinking products suitable as polymeric binder may also be formed, for example, by reaction of the crosslinkers added with polymeric anions which may also be present in dispersion A). Preference is given to those binders which have sufficient thermal stability to withstand the thermal stresses to which the finished capacitors are exposed to later, for example soldering temperatures of 220 to 260° C.

The solids content of the polymeric binder in dispersion A) is 0.1-90% by wt., preferably 0.5 to 30% by wt. and most preferably 0.5 to 10% by wt.

Figure 1:
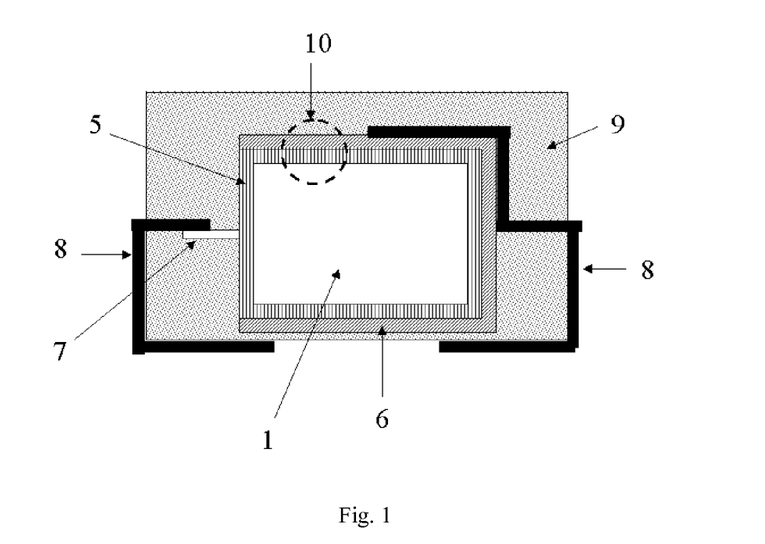
Figure 2:
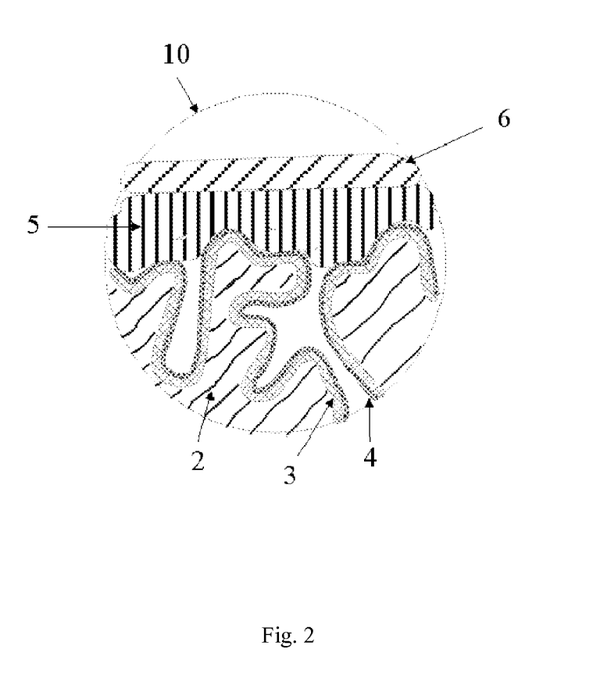

FIG. 1 describes a schematic illustration of the construction of a solid electrolytic capacitor using the example of a tantalum capacitor comprising
1 capacitor body
5 optional conductive outer layer
6 graphite/silver layer
7 wire contact to electrode body 2
8 outer contacts
9 encapsulation
10 detail FIG. 2 describes the enlarged detail 10 from FIG. 2 of the schematic layer structure of the tantalum capacitor comprising
10 detail
2 porous electrode body (anode)
3 dielectric
4 solid electrolyte (cathode)
5 optional conductive outer layer
6 graphite/silver layer.

Figure 3:
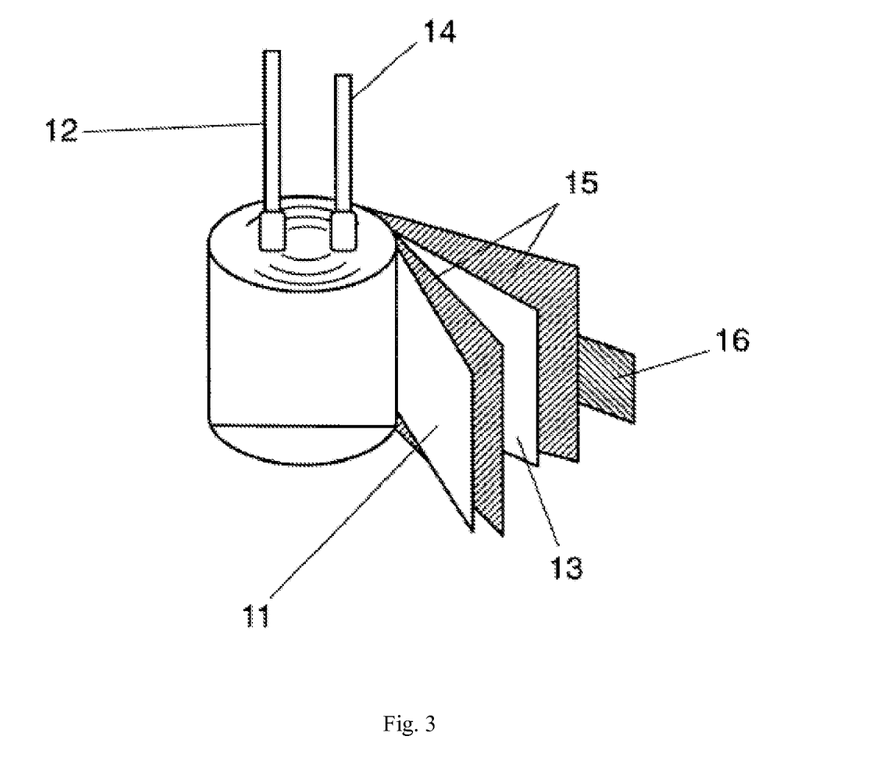

FIG. 3 describes a schematic illustration of the construction of a solid electrolytic capacitor using the example of an aluminium wound capacitor comprising
11 porous anode film
12 contact wire for anode film
13 cathode film
14 contact wire for cathode film
15 separator
16 adhesive tape In principle, such an inventive electrolytic capacitor can be produced as follows: first, for example, a valve metal powder with a high surface area is compressed and sintered to a porous electrode body. When this is done, an electrical contact wire, preferably of a valve metal, for example tantalum, is typically also compressed into the electrode body. It is alternatively also possible to etch metal foils in order to obtain a porous film. In the case of a wound capacitor, a porous anode film which forms the electrode body and a cathode film are separated by a separator and wound up.

The electrode body is then, for example, coated by electrochemical oxidation with a dielectric, i.e. an oxide layer.

Thereafter, in accordance with the invention, a dispersion A) comprising at least particles B) of an electrically conductive polymer, for example an optionally substituted polythiophene and a dispersant D) is applied to the oxidized electrode body and the solid electrolyte is formed by at least partly removing the dispersant D). If appropriate, further layers (referred to as conductive outer layer (5) in FIG. 1 and FIG. 2) are applied to the outer surface of the capacitor body. A coating with layers of good conductivity, such as graphite and silver, or a metallic cathode body with separator, as, for example, in the case of wound aluminium capacitors, serves as the electrode for discharging the current. Finally, the capacitor is optionally contact-connected and finally encapsulated.

Preference is given to using oxidized electrode bodies in the form of a film which is wound up (as shown, for example, in FIG. 3) or stacked together with a separator and a cathode film. The separator consists, for example, of cellulose fibres or synthetic fibres, for example polypropylene, polyester or polyamide fibres. Preference is given to separator papers comprising cellulose fibres.

Additionally preferred is a process for producing electrolytic capacitors, characterized in that the electrode material is a valve metal or a compound with electrical properties comparable to a valve metal.

In the context of the invention, valve metals are understood to mean those metals whose oxide layers do not enable current flow in both directions equally: in the case of anodic voltage, the oxide layers of the valve metals block current flow, whereas cathodic voltage results in large currents which can destroy the oxide layer. The valve metals include Be, Mg, Al, Ge, Si, Sn, Sb, Bi, Ti, Zr, Hf, V, Nb, Ta and W, and also an alloy or compound of at least one of these metals with other elements. The best known representatives of the valve metals are Al, Ta, and Nb. Compounds with electrical properties comparable to a valve metal are those which have metallic conductivity, which are oxidizable and whose oxide layers have the above-described properties. For example, NbO possesses metallic conductivity, but is generally not considered to be a valve metal. Layers of oxidized NbO, however, have the typical properties of valve metal oxide layers, and so NbO or an alloy or compound of NbO with other elements are typical examples of such compounds with electrical properties comparable to a valve metal.

Preference is given to electrode materials composed of tantalum, aluminium and those electrode materials based on niobium or niobium oxide.

Particular preference is given to electrode materials composed of aluminium.

Electrode materials based on niobium or niobium oxide are understood to mean those materials in which niobium or niobium oxide constitutes the component with the greatest quantitative proportion.

The electrode material based on niobium or niobium oxide is preferably niobium, NbO, a niobium oxide NbOx where x may assume values of 0.8 to 1.2, niobium nitride, niobium oxynitride or mixtures of these materials, or an alloy or compound of at least one of these materials with other elements.

Preferred alloys are alloys with at least one valve metal, for example Be, Mg, Al, Ge, Si, Sn, Sb, Bi, Ti, Zr, Hf, V, Nb, Ta or W.

Accordingly, the term "oxidizable metal" means not just metals, but also an alloy or compound of a metal with other elements, provided that they possess metallic conductivity and are oxidizable.

The oxidizable metals are, for example, sintered in powder form to a porous electrode body, or a porous structure is imparted to a metallic body. The latter can be done, for example, by etching a film.

The porous electrode bodies are oxidized, for example, in a suitable electrolyte, for example phosphoric acid or an aqueous solution of ammonium adipate, by applying a voltage. The magnitude of this forming voltage depends on the oxide layer thickness to be achieved and/or the later application voltage of the capacitor. Preferred forming voltages are 1 to 800 V, more preferably 1 to 300 V.

To produce the electrode body, metal powders with a specific charge of 1000 to 1 000 000 µC/g are preferred, more preferably with a specific charge of 5000 to 500 000 µC/g, even more preferably with a specific charge of 5000 to 300000 µC/g, exceptionally preferably with a specific charge of 10000 to 200000 µC/g, are used.

The specific charge of the metal powder is calculated as follows:

specific charge of the metal powder=(capacitance×anodization voltage)/weight of the oxidized electrode body.

The capacitance is determined from the capacitance of the oxidized electrode body measured at 120 Hz in an aqueous electrolyte. The electrical conductivity of the electrolyte is sufficiently great that, at 120 Hz, there is not yet a decline in the capacitance owing to the electrical resistivity of the electrolyte. For example, 18% aqueous sulphuric acid electrolytes are used for the measurement.

The electrode bodies used have a porosity of 10 to 90%, preferably of 30 to 80%, more preferably of 50 to 80%.

The porous electrode bodies have a mean pore diameter of 10 to 10 000 nm, preferably of 50 to 5000 nm, more preferably of 100 to 3000 nm.

Accordingly, the present invention more preferably provides a process for producing electrolytic capacitors, characterized in that the valve metal or the compound of electrical properties comparable to a valve metal is tantalum, niobium, aluminium, titanium, zirconium, hafnium, vanadium, an alloy or compound of at least one of these metals with other elements, NbO or an alloy or compound of NbO with other elements.

The dielectric consists preferably of an oxide of the electrode material. It optionally comprises further elements and/or compounds.

The capacitance of the capacitor depends, as well as on the type of dielectric, on the surface area and the thickness of the dielectric. The specific charge is a measure of how much charge per unit weight the oxidized electrode body can accommodate. The specific charge is calculated as follows:

specific charge of the capacitor=(capacitance×rated voltage)/weight of the oxidized electrode body.

The capacitance is determined from the capacitance of the finished capacitor measured at 120 Hz and the rated voltage is the specified use voltage of the capacitor. The weight of the oxidized electrode body is based on the simple weight of the dielectric-coated porous electrode material without polymer, contacts and encapsulations.

The electrolytic capacitors produced by the novel process preferably have a specific charge of 500 to 500 000 µC/g, more preferably a specific charge of 2500 to 250 000 µC/g, even more preferably a specific charge of von 2500 to 150 000 µC/g, exceptionally preferably a specific charge of 5000 to 100 000 µC/g.

Precursors for the preparation of conductive polythiophenes of the particles B) in dispersion A), also referred to hereinafter as precursors, are understood to mean appropriate monomers or derivatives thereof. It is also possible to use mixtures of different precursors. Suitable monomeric precursors are, for example, optionally substituted thiophenes, preferably optionally substituted 3,4-alkylenedioxythiophenes, 3,4-alkyleneoxythiathiophenes or thieno[3,4-b]thiophenes.

Examples of optionally substituted 3,4-alkylenedioxythiophenes, 3,4-alkyleneoxythiathiophenes or thieno[3,4-b]thiophenes include the compounds of the general formula (III) or of the general formula (IV) or of the general formula (XI) or a mixture of thiophenes of the general formulae (III) and (IV) or a mixture of thiophenes of the general formula (III) and (XI), or a mixture of thiophenes of the general formula (IV) and (XI) or a mixture of thiophenes of the general formula (III), (IV) and (XI)

(III)

(IV)

(XI)

in which

A is an optionally substituted $C_1$-$C_5$-alkylene radical, preferably an optionally substituted $C_2$-$C_3$-alkylene radical,

R is a linear or branched, optionally substituted $C_1$-$C_{18}$-alkyl radical, preferably linear or branched, optionally substituted $C_1$-$C_{14}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical, preferably optionally substituted $C_1$-$C_2$-hydroxyalkyl radical, or a hydroxyl radical, x is an integer of 0 to 8, preferably of 0 to 6, more preferably 0 or 1 and, in the case that a plurality of R radicals is bonded to A, they may be the same or different.

Particularly preferred monomeric precursors are optionally substituted 3,4-ethylenedioxythiophenes.

Examples of substituted 3,4-ethylenedioxythiophenes include the compounds of the general formula (V)

(V)

in which

R and x are each as defined for the general formulae (III) and (IV).

In the context of the invention, derivatives of these monomeric precursors are understood, for example, to mean dimers or trimers of these monomeric precursors. Also possible as derivatives are higher molecular weight derivatives, i.e. tetramers, pentamers, etc., of the monomeric precursors.

Examples of derivatives of substituted 3,4-alkylenedioxythiophenes include the compounds of the general formula (VI)

(VI)

in which n is an integer of 2 to 20, preferably 2 to 6, more preferably 2 or 3, and A, R and x are each as defined for the general formulae (III) and (IV).

The derivatives may be formed either from identical or different monomer mixtures and be used in pure form or in a mixture with one another and/or with the monomeric precursors. Oxidized or reduced forms of these precursors are, in the context of the invention, encompassed by the term "precursors", provided that their polymerization forms the same conductive polymers as for the precursors detailed above.

Useful substituents for the above-specified precursors, especially for the thiophenes, preferably for the 3,4-alkylenedioxythiophenes, include the radicals specified for the general formulae (III), (IV) or (XI) for R.

Optional further substituents of the A and/or the R radicals include the organic groups specified in connection with the general formulae (I), (II) or (X).

Processes for preparing the monomeric precursors for the preparation of conductive polymers and the derivatives thereof are known to those skilled in the art and are described, for example, in L. Groenendaal, F. Jonas, D. Freitag, H. Pielartzik & J. R. Reynolds, Adv. Mater. 12 (2000) 481-494 and literature cited therein.

The 3,4-alkyleneoxythiathiophenes of the formula (III) required for the preparation of the polythiophenes to be used are known to those skilled in the art or are preparable by known processes (for example according to P. Blanchard, A. Cappon, E. Levillain, Y. Nicolas, P. Frère and J. Roncali, Org. Lett. 4 (4), 2002, p. 607-609).

The thieno[3,4-b]thiophene of the formula (XI) required for the preparation of the polythiophenes to be used are known to those skilled in the art or are preparable by known processes (for example according to US2004/0074779A1).

The dispersions are prepared from the above-described precursors, for example, analogously to the conditions specified in EP-A 440 957. An improved variant for the preparation of the dispersions is that of using ion exchangers to remove the inorganic salt content or a portion thereof. Such a variant is described, for example, in DE-A 19627071. The ion exchanger can, for example, be stirred with the product, or the product is conducted through a column filled with ion exchange resin. The use of the ion exchanger allows, for example, the above-described low metal contents to be achieved.

The particle size of the particles B) in dispersion A) can be reduced, for example, by means of a high pressure homogenizer. This operation can also be repeated in order to enhance the effect. In particular pressures between 100 and 2000 bar have been found to be particularly advantageous in order to reduce the particle size.

Preparation of a polythiophene/polyanion complex and subsequent dispersion or redispersion in one or more solvent(s) is also possible.

The particles B) of the conductive polymer preferably form a stable dispersion. However, it is also possible to use unstable dispersions, by virtue of them being, for example, stirred, rolled or shaken up before use, in order to ensure homogeneous distribution of the particles B).

The dispersions A) are applied to the dielectric of the electrode body by known processes, for example by spin-coating, impregnating, casting, dropwise application, spraying, knife-coating, painting or printing, for example inkjet printing, screenprinting or pad printing.

The introduction of the dispersion into the porous electrode body can be facilitated, for example, by means of elevated or reduced pressure, vibration, ultrasound or heat.

The application to the dielectric of the electrode body can be effected directly or using an adhesion promoter, for example a silane, for example organofunctional silanes or hydrolysates thereof, e.g. 3-glycidoxypropyltrialkoxysilane, 3-aminopropyltriethoxysilane, 3-mercaptopropyltrimethoxysilane, 3-methacryloyloxypropyltrimethoxysilane, vinyltrimethoxysilane or octyltriethoxysilane, and/or one or more other functional layers.

After the dispersion A) has been applied, the dispersant D) is preferably removed, in order that the particles B) and any further additives in the dispersion of the solid electrolyte can form the polymeric intermediate layer or the polymeric outer layer. However, it is also possible for at least a portion of the dispersant D) to remain in the solid electrolyte.

The dispersant D) can be removed after the dispersion has been applied by simple evaporation at room temperature. To achieve higher processing speeds, it is, however, more advantageous to remove the dispersants D) at elevated temperatures, for example at temperatures of 20 up to 300° C., preferably 40 up to 250° C. A thermal aftertreatment can be undertaken directly with the removal of the solvent or else at a different time from the completion of the coating.

Depending on the kind of dispersion used for the coating, the duration of the heat treatment is 5 seconds to several hours. For the thermal treatment, it is also possible to use temperature profiles with different temperatures and residence times.

The thermal treatment can be performed, for example, in such a way that the coated oxidized electrode bodies are moved through a heated chamber at the desired temperature at such a speed that the desired residence time at the selected temperature is achieved, or contacted with a hotplate at the desired temperature for the desired residence time. In addition, the thermal treatment can, for example, be effected in an oven or several ovens with different temperatures.

According to the type of oxidized electrode body, it may be advantageous to impregnate the oxidized electrode bodies with the dispersions once or more than once again, in order to achieve thicker polymers and/or a greater coverage of the dielectric surface layer.

The application of the dispersion A) and the at least partial removal of the dispersant D) are effected repeatedly.

The coverage of the dielectric with the solid electrolyte can be determined as follows: The capacitance of the capacitor is measured in the dry and moist state at 120 Hz. The degree of coverage is the ratio of the capacitance in the dry state to the capacitance in the moist state, expressed in percent. "Dry state" means that the capacitor has been dried at elevated temperature (80-120° C.) over several hours, before it is analysed. "Moist state" means that the capacitor has been exposed to saturated air humidity under elevated pressure, for example in a steam boiler, over several hours. In the course of this, the moisture penetrates into the pores not covered by the solid electrolyte, and acts there as a liquid electrolyte.

The coverage of the dielectric by the solid electrolyte is preferably greater than 50%, more preferably greater than 70%, most preferably greater than 80%.

After production of the solid electrolyte, it is possible to apply further conductive layers, for example a conductive outer layer, on the capacitor body. Preference is given to applying a polymeric outer layer, for example as described in European patent application EP-A 1 524 678. Further layers with good conductivity, for example graphite and/or silver layers, serve as current collectors. In wound capacitors, a cathode film which is separated from the capacitor body (anode film) by a separator serves as the current collector. Finally, the capacitor is optionally contact-connected and finally encapsulated.

The present invention further provides a dispersion comprising at least particles comprising an electrically conductive polythiophene, which is optionally substituted, and a dispersant, characterized in that the pH of the dispersion measured at 25° C. is greater than or equal to 1.8 and less than or equal to 3.9, preferably greater than or equal to 2 and less than or equal to 3.5, more preferably greater than or equal to 2 and less than or equal to 3, even more preferably greater than or equal to 2 and less than or equal to 2.8, and in that the particles comprising a polythiophene, in the dry state, possess a specific electrical conductivity greater than 100 S/cm.

For the dispersion, the same preferred ranges apply as the preferred ranges detailed above for the dispersion A) from the process according to the invention.

The process according to the invention and the inventive dispersion thus enable the production of solid electrolytic capacitors with low equivalent series resistance (ESR), in which no in situ polymerization is required. The electrolytic capacitors produced by the process according to the invention thus form a further part of the subject-matter of the present invention.

The electrolytic capacitors produced in accordance with the invention are outstandingly suitable, owing to their low ESR, for use as a component in electronic circuits, for example as filter capacitors or decoupling capacitors. The use also forms part of the subject-matter of the invention. Preference is given to electronic circuits, as present, for example, in computers (desktops, laptops, servers), in computer peripherals (e.g. PC cards), in portable electronic devices, for example mobile phones, digital cameras or amusement electronics, in devices for amusement electronics, for example in CD/DVD players and computer game consoles, in navigation systems, in telecommunications equipment, in domestic appliances, in voltage supplies or in automotive electronics.

The examples which follow serve to illustrate the invention by way of example and should not be interpreted as a restriction.

EXAMPLES

Example 1

A 2 l three-neck flask with stirrer and internal thermometer was initially charged with 868 g of deionized water, 330 g of an aqueous polystyrenesulphonic acid solution with a mean molecular weight of 70 000 and a solids content of 3.8% by weight. The reaction temperature was kept between 20 and 25° C. With stirring, 5.1 g of 3,4-ethylenedioxythiophene were added. The solution was stirred for 30 minutes (min). Subsequently, 0.03 g of iron(III) sulphate and 9.5 g of sodium persulphate were added and the solution was stirred for a further 24 hours (h).

After the reaction had ended, inorganic salts were removed using 100 ml of a strongly acidic cation exchanger and 250 ml of a weakly basic anion exchanger, and the solution was stirred for a further 2 h. The ion exchanger was filtered off. The poly(3,4-ethylenedioxythiophene)/polystyrenesulphonate dispersion was homogenized ten times at a pressure of 700 bar with a high-pressure homogenizer. Subsequently, the dispersion was concentrated up to a solids content of 2% and then additionally homogenized five times more at a pressure of 1500 bar.

28 g of dimethyl sulphoxide (DMSO) were added to 700 g of the dispersion thus prepared, and stirred to give a dispersion A)-1.

The pH of the dispersion A)-1 was 1.6 at 25° C.

The dispersion A)-1 was adjusted to a pH of 2 by means of aqueous ammonia. The viscosity of the dispersion A)-2 thus prepared was 34 mPa*s at a shear rate of 100 Hz and 20° C.

Dispersion A)-2 had the following particle size distribution:
$d_{10}$ 21 nm
$d_{50}$ 28 nm
$d_{90}$ 50 nm The diameter of the particles B) of the conductive polymer is based on a mass distribution of the particles B) in the dispersion as a function of particle diameter. The determination was effected by means of an ultracentrifuge measurement. The particle size was determined in the swollen state of the particles.

An ICP analysis of the metal contents of dispersion A)-2 gave the following values:
sodium (Na): 110 mg/kg
magnesium (Mg): 0.8 mg/kg
aluminium (Al): 1.2 mg/kg
silicon (Si): 1.5 mg/kg
phosphorus (P): 4.5 mg/kg
potassium (K): 0.7 mg/kg
calcium (Ca): 4.3 mg/kg
chromium (Cr): 0.20 mg/kg
iron (Fe): 0.85 mg/kg
zinc (Zn): <0.01 mg/kg Example 2

A portion of dispersion A)-2 from Example 1 was spun onto a microscope slide (26 mm*26 mm*1 mm) by means of a spin-coater (Chemat Technology KW-4A) at 1000 rpm for 5 seconds. The sample was dried at 120° C. for 10 min. Subsequently, two opposite edges of the microscope slide were coated with conductive silver. After the conductive silver had been dried, the two silver strips were connected to contacts and a Keithley 199 Multimeter was used to determine the surface resistivity. The layer thickness was determined with a Tencor Alpha Step 500 Surface Profiler. Surface resistivity and layer thickness d were used to determine specific conductivity σ according to σ=1/(R□×d). The layer thickness was 150 nm and the specific conductivity was 410 S/cm.

Example 3

3.1. Production of Oxidized Electrode Bodies

A porous aluminium foil which has been anodized to 92 V and is of dimensions 170 mm×5 mm (anode foil) and a porous aluminium foil of dimensions 200 mm×5 mm (cathode foil) were each provided with a contact wire, then wound together with two cellulose separator papers as shown in FIG. 3 and fixed with adhesive tape. 10 of these oxidized electrode bodies were produced. The separator paper of the oxidized electrode bodies was then carbonized in an oven at 300° C.

3.2 Production of the Solid Electrolyte

The pH of dispersion A)-1 (from Example 1) was adjusted to a value of 1.8 by adding aqueous ammonia at 25° C. The oxidized electrode bodies were impregnated in the dispersion obtained in this way for 15 min. This was followed by drying at 150° C. for 40 min. Impregnation and drying were carried out twice more.

The mean electrical values of the 10 capacitors manufactured in the above manner can be found Table 1. The capacitance (in microfarads) was determined at 120 Hz and the equivalent series resistance (ESR) (in milliohms) at 100 kHz by means of an LCR meter (Agilent 4284A).

Example 4

10 capacitors were manufactured analogously to Example 3 and analyzed, except that the dispersion A)-2 (pH=2) from Example 1 was used to form the solid electrolytes. The mean electrical values of the 10 capacitors thus manufactured can be found in Table 1.

Example 5

10 capacitors were manufactured analogously to Example 3 and analyzed, except that the pH of the dispersion A)-1 (from Example 1) was adjusted to a value of 2.5 by adding dimethylethanolamine. The mean electrical values of the 10 capacitors thus manufactured can be found in Table 1.

Example 6

10 capacitors were manufactured analogously to Example 3 and analyzed, except that the pH of the dispersion A)-1 (from Example 1) was adjusted to a value of 3 by adding aqueous ammonia. The mean electrical values of the 10 capacitors thus manufactured can be found in Table 1.

Example 7

10 capacitors were manufactured analogously to Example 3 and analyzed, except that the pH of the dispersion A)-1 (from Example 1) was adjusted to a value of 3.5 by adding aqueous ammonia. The mean electrical values of the 10 capacitors thus manufactured can be found in Table 1.

Comparative Example 1

10 capacitors were manufactured analogously to Example 3 and analyzed, except that the pH of the dispersion A)-1 (from Example 1) was not increased by adding aqueous ammonia but left at the original value of 1.6. The mean electrical values of the 10 capacitors thus manufactured can be found in Table 1.

Comparative Example 2

10 capacitors were manufactured analogously to Example 3 and analyzed, except that the pH of the dispersion A)-1 (from Example 1) was adjusted to a value of 4 by adding aqueous ammonia. The mean electrical values of the 10 capacitors thus manufactured can be found in Table 1.

Comparative Example 3

10 capacitors were manufactured analogously to Example 3 and analyzed, except that the pH of the dispersion A)-1 (from Example 1) was adjusted to a value of 5 by adding aqueous ammonia. The mean electrical values of the 10 capacitors thus manufactured can be found in Table 1.

Comparative Example 4

10 capacitors were manufactured analogously to Example 3 and analyzed, except that the pH of the dispersion A)-1

(from Example 1) was adjusted to a value of 7 by adding aqueous ammonia. The mean electrical values of the 10 capacitors thus manufactured can be found in Table 1.

Comparative Example 5

10 capacitors were manufactured analogously to Example 3 and analyzed, except that the pH of the dispersion A)-1 (from Example 1) was adjusted to a value of 10 by adding aqueous ammonia. The mean electrical values of the 10 capacitors thus manufactured can be found in Table 1.

TABLE 1

|  | pH | Capacitance [µF] | ESR [mΩ] |
|---|---|---|---|
| Example 3 | 1.8 | 80 | 20 |
| Example 4 | 2 | 90 | 13 |
| Example 5 | 2.5 | 90 | 13 |
| Example 6 | 3 | 85 | 12 |
| Example 7 | 3.5 | 82 | 19 |
| Comparative Example 1 | 1.6 | 68 | 141 |
| Comparative Example 2 | 4 | 70 | 27 |
| Comparative Example 3 | 5 | 71 | 26 |
| Comparative Example 4 | 7 | 74 | 26 |
| Comparative Example 5 | 10 | 70 | 32 |

The capacitors produced in accordance with the invention from Examples 3 to 7 have significantly lower ESR values and higher capacitance values than the capacitors from Comparative Examples 1 to 5. By means of dispersions with a pH of 1.8 to 3.9, it is accordingly possible to produce higher-performance solid electrolytic capacitors than with those dispersions whose pH is less than 1.8 or greater than 3.9.

The invention claimed is:

1. A process for producing an electrolytic capacitor, at least comprising, that
    a) onto a porous body, at least comprising
        a porous electrode body of an electrode material and a dielectric which covers the surface of this electrode material,
        is applied a dispersion A)
        which comprises at least particles B) of an electrically conductive polymer and a dispersant D),
    b) and a solid electrolyte which partly or fully covers the dielectric surface is formed by at least partly removing the dispersant D),
        characterized in that the pH of the dispersion A) measured at 25° C. is greater than or equal to 1.8 and less than or equal to 3.9.

2. The process according to claim 1, characterized in that particles B) of dispersion A) in the dry state have a specific electrical conductivity of greater than 100 S/cm.

3. The process according to claim 1, characterized in that the particles B) of the conductive polymer in dispersion A) have a mean diameter of 1-100 nm.

4. The process according to claim 1, characterized in that the dispersion A) has a content of metals of less than 5000 mg/kg.

5. The process according to claim 1, characterized in that the particles B) in dispersion A) comprise at least one polythiophene with repeat units of the general formula (I) or of the general formula (II) or of the general formula (X) or repeat units of the formulae (I) and (II) or repeat units of the formulae (I) and (X) or repeat units of the formulae (II) and (X) or repeat units of the formulae (I), (II) and (X)

in which
A is an optionally substituted $C_1$-$C_5$-alkylene radical,
R is independently H, a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical,
x is an integer of 0 to 8 and,
in the case that a plurality of R radicals is bonded to A, they may be the same or different.

6. The process according to claim 1, characterized in that the conductive polymer in dispersion A) is an optionally substituted poly(3,4-ethylenedioxythiophene).

7. The process according to claim 1, characterized in that the particles B) additionally comprise at least one polymeric anion.

8. The process according to claim 7, characterized in that the polymeric anion is an anion of a polymeric carboxylic or sulphonic acid.

9. The process according to claim 1, characterized in that the dispersion A) comprises, as the dispersant D), organic solvents, water or mixtures of organic solvents and water.

10. The process according to claim 1, characterized in that dispersion A) additionally comprises crosslinkers, surface-active substances, further additives, or combinations thereof.

11. The process according to claim 1, characterized in that the electrode material of the electrode body is a valve metal or a compound with properties comparable to a valve metal.

12. An electrolytic capacitor produced by a process according to claim 1.

13. A method comprising using the electrolytic capacitors according to claim 12 in electronic circuits.

14. An electronic circuit comprising an electrolytic capacitor according to claim 13.

15. A dispersion comprising at least particles comprising an electrically conductive polythiophene, which is optionally substituted, and a dispersant, characterized in that the pH of the dispersion measured at 25° C. is greater than or equal to 1.8 and less than or equal to 3.9, and in that the particles comprising a polythiophene, in the dry state, possess a specific electrical conductivity greater than 100 S/cm.

* * * * *